US011992106B2

(12) United States Patent
Valdez et al.

(10) Patent No.: US 11,992,106 B2
(45) Date of Patent: May 28, 2024

(54) RAZOR PRESERVATION SYSTEM

(71) Applicant: BladeLife LLC, Arlington, MA (US)

(72) Inventors: Socrates David Valdez, Cambridge, MA (US); Peter Gladstone, Arlington, MA (US)

(73) Assignee: BladeLife LLC, Arlington, MA (US)

(*) Notice: Subject to any disclaimer, the term of this patent is extended or adjusted under 35 U.S.C. 154(b) by 578 days.

(21) Appl. No.: 17/157,486

(22) Filed: Jan. 25, 2021

(65) Prior Publication Data

US 2021/0235839 A1 Aug. 5, 2021

Related U.S. Application Data

(60) Provisional application No. 62/967,703, filed on Jan. 30, 2020.

(51) Int. Cl.
*A45D 27/22* (2006.01)
*B26B 21/40* (2006.01)
*B65D 81/26* (2006.01)

(52) U.S. Cl.
CPC .......... *A45D 27/22* (2013.01); *B26B 21/4037* (2013.01); *B65D 81/268* (2013.01)

(58) Field of Classification Search
USPC ...................................... 206/204–213.1, 352
See application file for complete search history.

(56) References Cited

U.S. PATENT DOCUMENTS

| | | | | |
|---|---|---|---|---|
| 2,349,183 A | 5/1944 | Mahler | | |
| 2,748,413 A | 6/1956 | Morrow | | |
| 7,858,027 B2 * | 12/2010 | Trissel | A45D 27/46 | 206/352 |
| 8,342,322 B2 | 1/2013 | De'Rennaux | | |
| 8,458,922 B2 | 6/2013 | Parisi et al. | | |
| 8,770,398 B1 | 7/2014 | Krok et al. | | |
| 9,581,341 B1 | 2/2017 | Krok et al. | | |
| 2008/0189965 A1 * | 8/2008 | Trissel | A45D 27/46 | 30/538 |
| 2011/0225834 A1 * | 9/2011 | Cirilli | A45D 27/46 | 206/352 |
| 2018/0160790 A1 | 6/2018 | Swatty et al. | | |

* cited by examiner

*Primary Examiner* — Bryon P Gehman
(74) *Attorney, Agent, or Firm* — DLA PIPER LLP (US)

(57) ABSTRACT

In one aspect, the present disclosure relates to a device that may extend the lifetime of a razor blade. The device may include a housing having a first opening at a first end of the housing and a second opening opposite of the first end; a desiccant to absorb moisture within the housing; a cartridge to hold the desiccant, wherein one side of the desiccant is exposed to the air inside the interior; a base body connected to the second opening of the housing, having a cavity to receive and hold the cartridge; a handle having a hollowed inside portion configured to hold an inserted razor blade handle; at least one one-way valve connected to the handle that, when the handle is inserted into the housing, allows allow air to be evacuated from the interior of the housing.

15 Claims, 15 Drawing Sheets

RAZOR PRESERVATION SYSTEM

CROSS-REFERENCE TO RELATED APPLICATIONS

This application claims priority to U.S. Provisional Application No. 62/967,703, filed Jan. 30, 2020, the content of which is incorporated herein by reference in its entirety.

BACKGROUND

In the past decade or so, the high prices of razor blades has contributed to a markedly high level of consumer frustration within the shaving market. Consumer frustration often yields a significant market opportunity, and in this case it has been taken advantage of by newer companies like Dollar Shave Club and Harry's Razors. These companies offer low-priced alternatives to high-end, expensive razors and razor blades.

However, the true cost-sink of razor blades comes not from the absolute cost of a single blade (the most expensive Gillette razor blade is approximately $2), but from the frequency in which they must be replaced. The average man changes his blade every two weeks, suggesting the expense comes from the volume of blades consumed over a period of time. Therefore, another way to solve the blade cost issue is to make blades last longer.

The short lifetimes of razor blades is not however, due just to the frequency in which it is used. In terms of blade sharpness and performance, the actual act of shaving isn't the only contributor to blade wear. Two other important factors that are responsible for the short lifetimes is the oxidation and moisture buildup. If these can be limited, razor blade lifetimes can face significant increases, thereby easing the financial burden on consumers in the shaving market.

SUMMARY

A razor blade preservation device that extends the lifetime of a razor blade is provided that may include a housing with a first opening at a first end of said housing and a second opening opposite of said first end; a cartridge to hold a desiccant, where only one side of the desiccant is exposed to the air inside the interior; a desiccant to be stored in said cartridge to absorb moisture; a base body connected to said second opening of said housing, with a cavity for which to receive and hold said cartridge; a handle that can be inserted into said first opening of said housing to create an interior within said housing, wherein said handle has a hollowed inside configured to hold an inserted razor blade handle, allowing the razor blade to reside within the interior; and a plurality of valves connected to said handle that, when said handle is inserted into said housing, allow air to be evacuated from the interior of said housing.

In some embodiments, the handle may include a seal that is disposed between the handle and the housing to seal the interior. In some embodiments, the hollowed inside of the handle may be made of rubber and be configured to hold a variety of razor blade handle shapes.

In some embodiments, the razor blade preservation device may include two rubber strips to seal the interior. In some embodiments, the base body of the device may include a ventilated surface to expose the desiccant to the interior of the housing. In some embodiments, the base body may include a perforated surface below the ventilated surface enclosing the desiccant. In some embodiments, the cartridge may include a release slider connected to the cartridge which, when slid, allows the cartridge to be detached from the base body and removed.

In some embodiments, the cartridge may include a rotate latch connected to the cartridge which, when rotated, allows the cartridge to be detached from the base body and removed. In some embodiments, the hollowed inside may include a plurality of flaps arranged in a circle; and an opening at a center of the circle, wherein the razor blade handle is inserted through the circle and friction between the plurality of flaps and the razor blade handle holds the razor in place.

In some embodiments, each flap of the plurality of flaps may be made of rubber. In some embodiments, the plurality of flaps may be a first plurality of flaps and the circle may be a first circle. The hollowed inside may include a second plurality of flaps arranged in a second circle; and an opening at a center of the second circle, wherein the razor blade handle is inserted through the first and second circles and friction between the first and second plurality of flaps and the razor blade handle holds the razor in place. In some embodiments, the first and second circles may be concentric. In some embodiments, the preservation device may include a pouch to contain the desiccant. In some embodiments, the desiccant may include an indicator that reflects a strength of the desiccant. In some embodiments, the desiccant may change color, wherein the color may reflect a level of saturation.

In another embodiment of the present disclosure, a device that extends the lifetime of a razor blade may include a plunger, wherein the plunger may be configured to receive a razor blade handle and hold the razor blade handle; a removable cartridge configured to contain a desiccant pouch; and a housing, wherein the housing may be configured to receive the removable cartridge and the plunger to create a seal within an interior region within the housing, wherein the desiccant pouch is exposed to the interior region of the housing. In some embodiments, the plunger may include two rubber strips to seal the interior region. In some embodiments, the removable cartridge may include a rotate latch that, when rotated, allows the cartridge to be removed from the housing. In some embodiments, the desiccant pouch may include an indicator that reflects at least one of a strength or saturation level of the desiccant. In some embodiments, the plunger may include a plurality of flaps arranged in a circle; and an opening at a center of the circle, wherein the razor blade handle is inserted through the circle and friction between the plurality of flaps and the razor blade handle holds the razor blade handle in place.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

The following detailed description is merely exemplary in nature and is not intended to limit the invention or the applications of its use.

Embodiments of this disclosure provide a device to extend the usable lifetime of a razor blade. By storing a razor blade in an environment with decreased levels of oxygen and moisture, oxidation and wear on the blade can be limited. As these are the predominant factors that affect razor blade lifetime, as opposed to actual use, storage such as this can significantly increase blade lifetimes and decrease costs for consumers. This environment is achieved via the device itself, which has a handle configured to hold a razor blade; when the handle is inserted into a main compartment, air is forced out through a plurality of one-way valves and kept out with a seal. A desiccant is stored at the bottom of the compartment to remove moisture from within the interior, where the blade is housed. The blade may be stored here between uses, and the device is designed such that it may inconspicuously sit atop a bathroom sink, on a shower shelf, etc.

Figure 1:
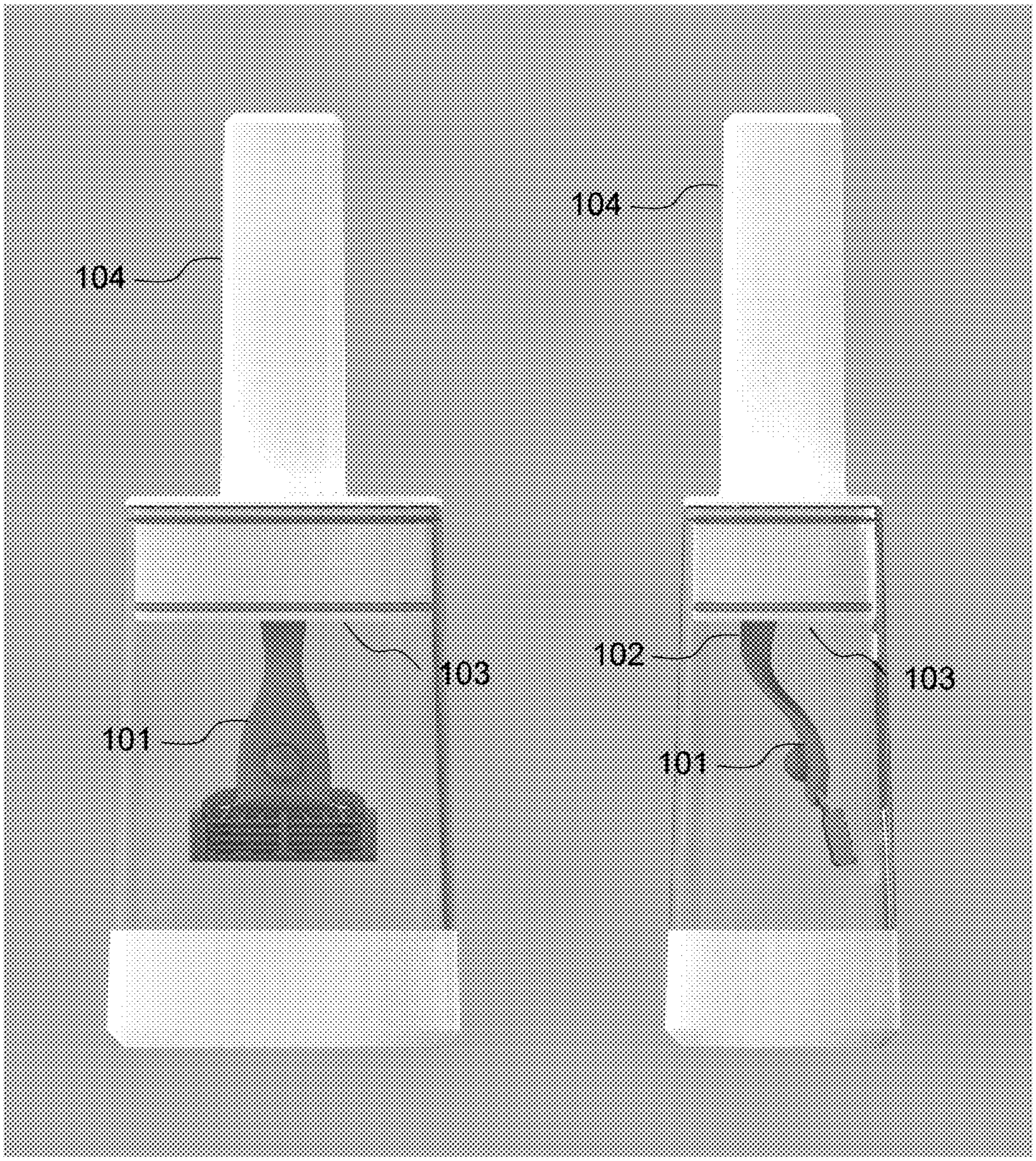
FIG. 1A is a front view of a razor preservation device, according to some embodiments of the present disclosure.
FIG. 1B is a side view a razor preservation device, according to some embodiments of the present disclosure.

FIG. 1A is a front view of a razor preservation device, according to some embodiments of the present disclosure. Razor blade handle 102 is inserted and held by the inner surface of hollowed inside portion 103 of handle 104. The friction between the inner surface and razor blade handle 102 may be great enough that it can securely hold razor blade handle 101 in place. FIG. 1B is a side view a razor preservation device, according to some embodiments of the present disclosure.

Figure 2:
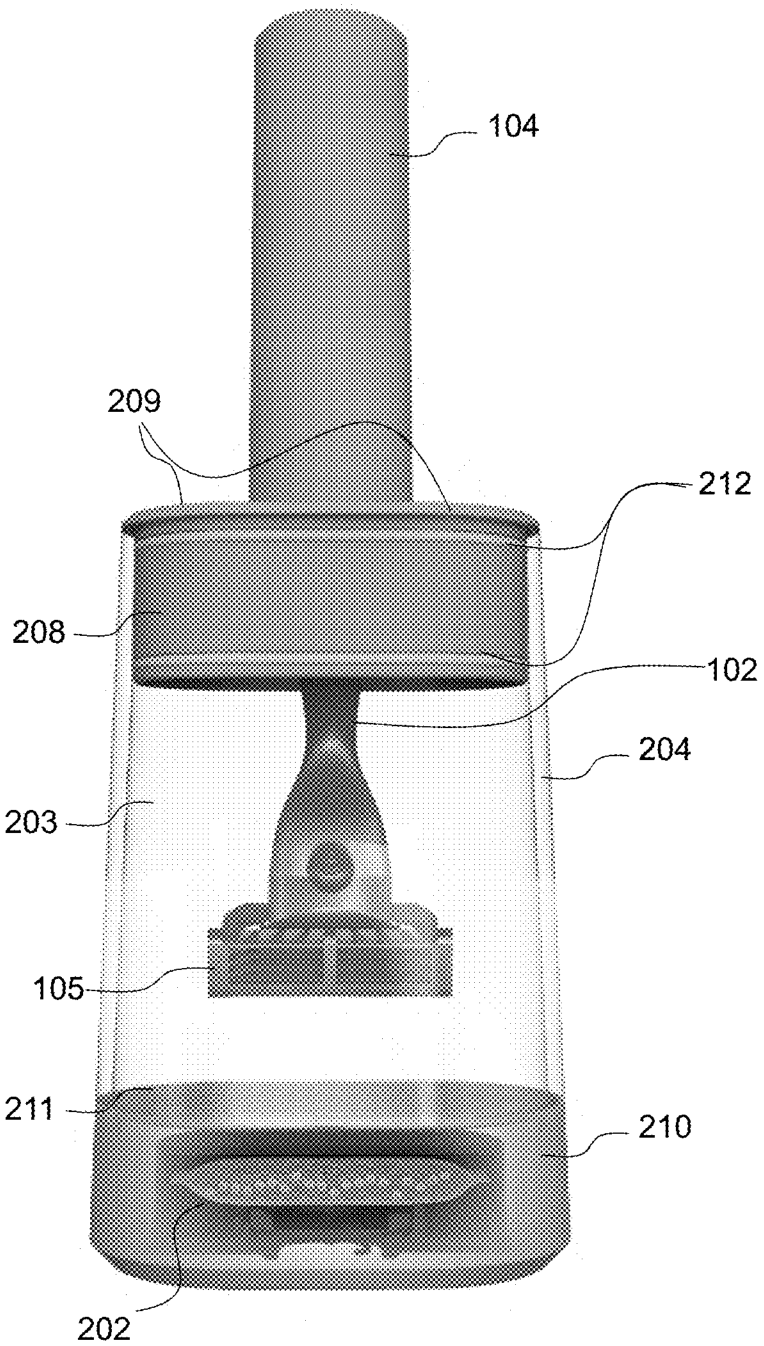
FIG. 2 shows the operation of a razor preservation device, according to some embodiments of the present disclosure.

FIG. 2 shows the operation of a razor preservation device, according to some embodiments of the present disclosure. The razor preservation device shown in FIG. 2 may include desiccant 202 absorbing moisture from interior 203 of housing 204, according to some embodiments of the present disclosure. In some embodiments, razor preservation device 201 may be in full operation. Razor blade handle 102 may be inserted and held by hollowed inside (not visible, see FIG. 5) of handle 104, and handle 104 may be inserted into housing 204 to create interior 203. Razor blade 105 may reside within interior 203. Plunger 208, which may be disposed between handle 104 and housing 204, may create a seal, preventing exterior air from entering interior 203. Plunger 208 may include two rubber bands/strips 212 disposed on the top and bottom to create a seal. When handle 104 is inserted into housing 204, plurality of valves 209 may allow air to be evacuated from interior 203, reducing the amount of oxygen that can interact with razor blade 105. Reducing the amount of oxygen may reduce the rate of oxidation and thus may extend the usable lifetime of razor blade 105.

In some embodiments, desiccant 202 may be stored in a cartridge (not visible, see FIG. 14) and may be held by base body 210. Desiccant 202 may also be stored in a pouch within the cartridge. Base body 210 may have ventilated surface 211 above desiccant 202 to allow optimal absorption of moisture from interior 203. Desiccant 202 may absorb moisture both from the remaining air inside interior 203 and from razor blade 105. In some embodiments, desiccant 202 may be color changing. In some embodiments, desiccant 202 may change color once it reaches a certain level of absorption, indicating to a user that it needs to swapped out with a new one.

The presence of moisture on razor blade 105 may be a significant contributor to corrosion and dullness and wears on the blade more than the actual use of the blade. As such, the presence of desiccant 202 to remove moisture from the environment in which razor blade 105 is housed may lessen the effects of corrosion and prevent dullness, thereby decreasing the wear on the blade and increasing its usable lifetime. In some embodiments, the combination of limiting the razor blade's exposure to both air and moisture may have a significant effect on the lifetime of the razor blade.

Figure 3:
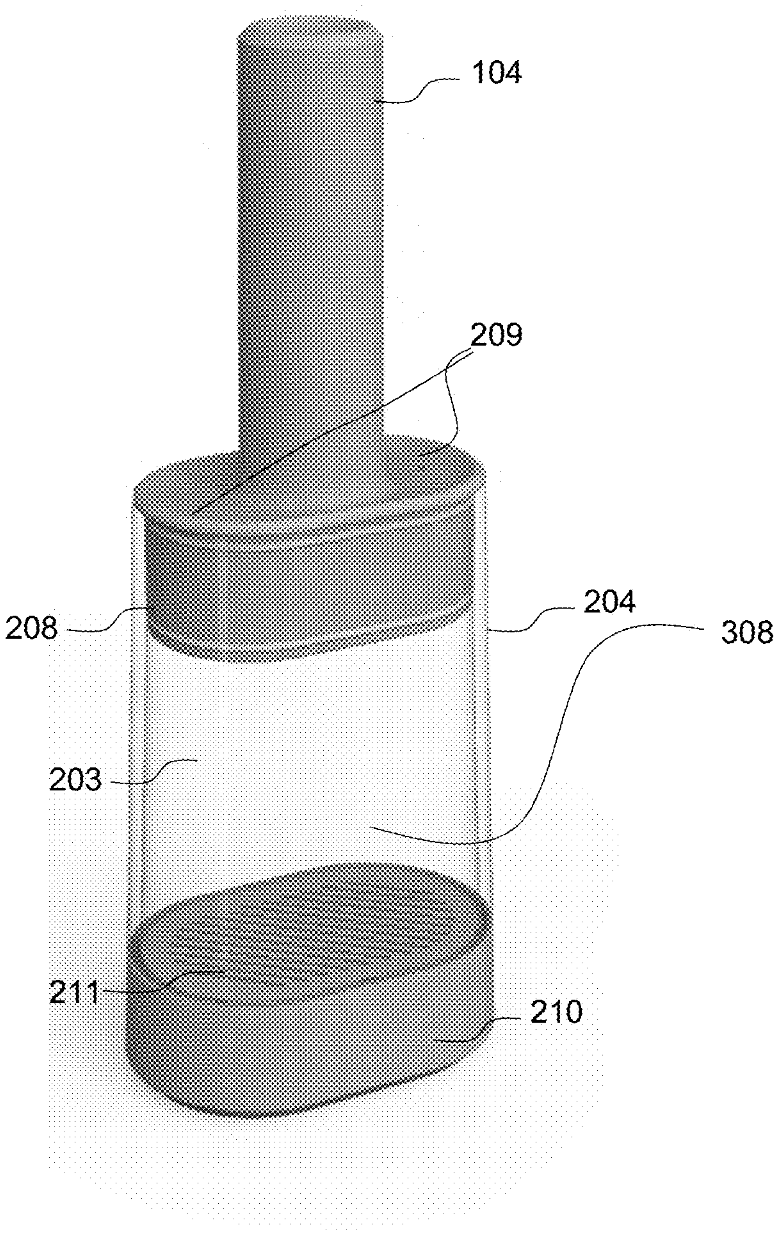
FIG. 3 is a perspective view of a razor blade preservation device, according to some embodiments of the present disclosure.

FIG. 3 is a perspective view of a razor blade preservation device, according to some embodiments of the present disclosure. Interior 203 may be formed by base body 210, handle 104, and housing 204. Base body 210 and housing 204 may be connected, and base body 210 acts as a base from which the device may stand. Interior 203 may be formed when handle 104 is inserted into housing 204. In some embodiments, plunger 208 may be disposed between handle 104 and housing 204, sealing interior 203 and preventing exterior air from entering interior 203 and interacting with a razor blade therein. Plurality of valves 209 may be located on handle 104 to allow air to be evacuated from interior 203. When handle 104 is inserted into housing 204, air from within housing 204 may be forced out through valves 209. As plunger 208 prevents exterior air from entering interior 203, this reduces the total amount of air within interior 203. Base body 210 may have a cavity 308 to hold a cartridge, which stores a desiccant. See FIGS. 2, 9, 14 and 15 for discussion of the cartridge and desiccant. In some embodiments, base body 210 has ventilated surface 211 which may optimize the desiccant's exposure to interior 203. The desiccant may absorb moisture from interior 203. By limiting the air and moisture that can interact with razor blades stored within interior 203, the lifetime of the razor blade can be significantly extended.

Figure 4:
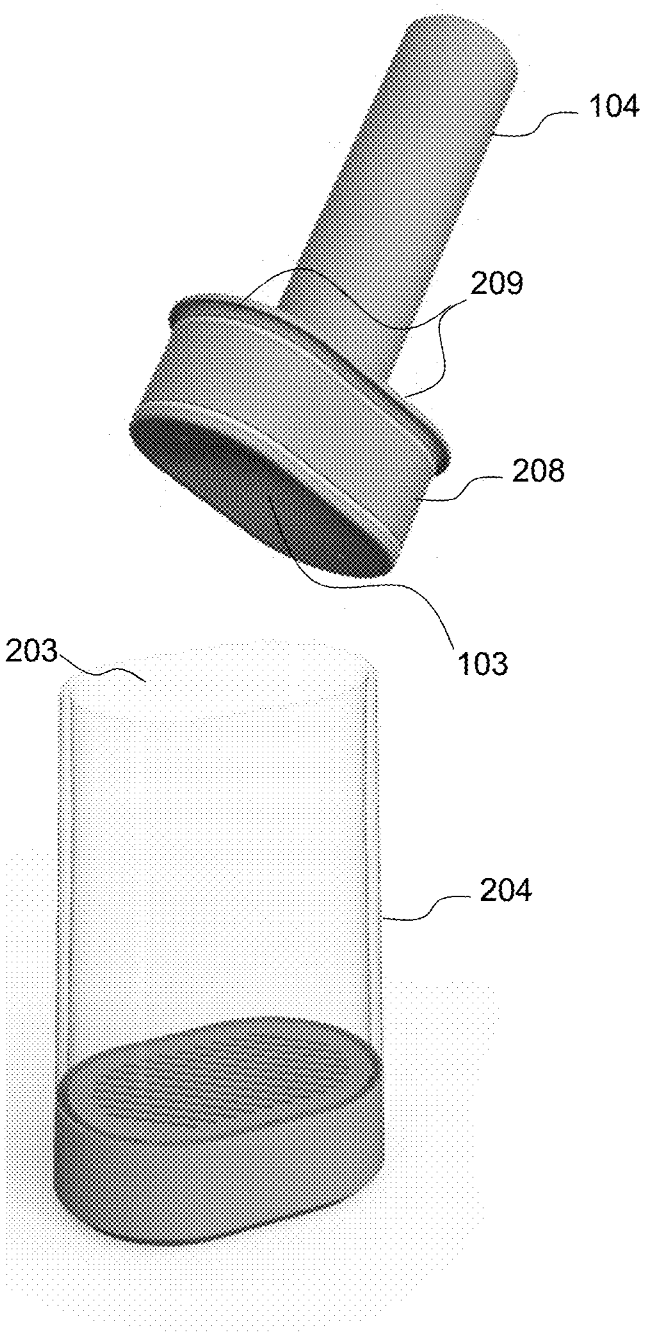
FIG. 4 is another perspective view of a razor blade preservation device, according to some embodiments of the present disclosure.

FIG. 4 is another perspective view of a razor blade preservation device, according to some embodiments of the present disclosure. The razor preservation device of FIG. 4 may include handle 104 when it has been removed from housing 204. When interior 203 is sealed: plunger 208 and plurality of valves 209 on handle 104 prevent air from leaving interior 203. When handle 104 is removed from interior 203, it may create an opening for exterior air to enter interior 203 again. Removing handle 104 then allows access to hollowed inside portion 103 which may be configured to hold an inserted razor blade handle.

Figure 5:
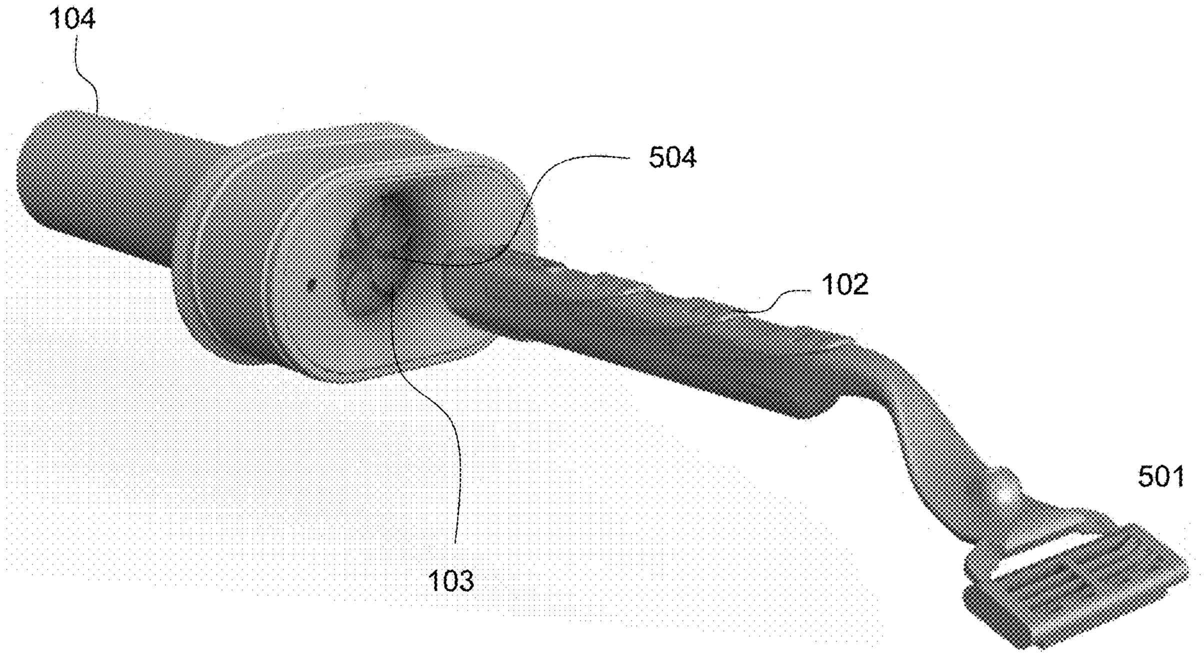
FIG. 5 shows a razor being inserted into a handle of a razor preservation device, according to some embodiments of the present disclosure.

FIG. 5 shows a razor being inserted into a handle of a razor preservation device, according to some embodiments of the present disclosure. The razor preservation device of FIG. 5 may include razor blade 501 inserted into handle 104, according to some embodiments of the present disclosure. In some embodiments, hollowed inside 103 of handle 104 may be made of rubber. Hollowed inside 103 may also be configured to hold a variety of razor blade handle shapes and sizes. A plurality of teeth 504 within hollowed inside 103 may be configured such that, when razor blade handle 102 is inserted, the friction between teeth 504 and razor blade handle 102 may be sufficient to securely hold razor blade handle 102 and prevent razor blade 501 from falling out during storage. In some embodiments, the holding strength may be strong enough that the person using razor blade 501 to shave may hold handle 104 of the device with razor blade handle 102 inserted, rather than razor blade handle 102, whilst shaving. This may allow the user a more steady grip while shaving, as handle 104 with a razor blade 501 inserted is more massive than razor blade 501 by itself.

Figure 6:
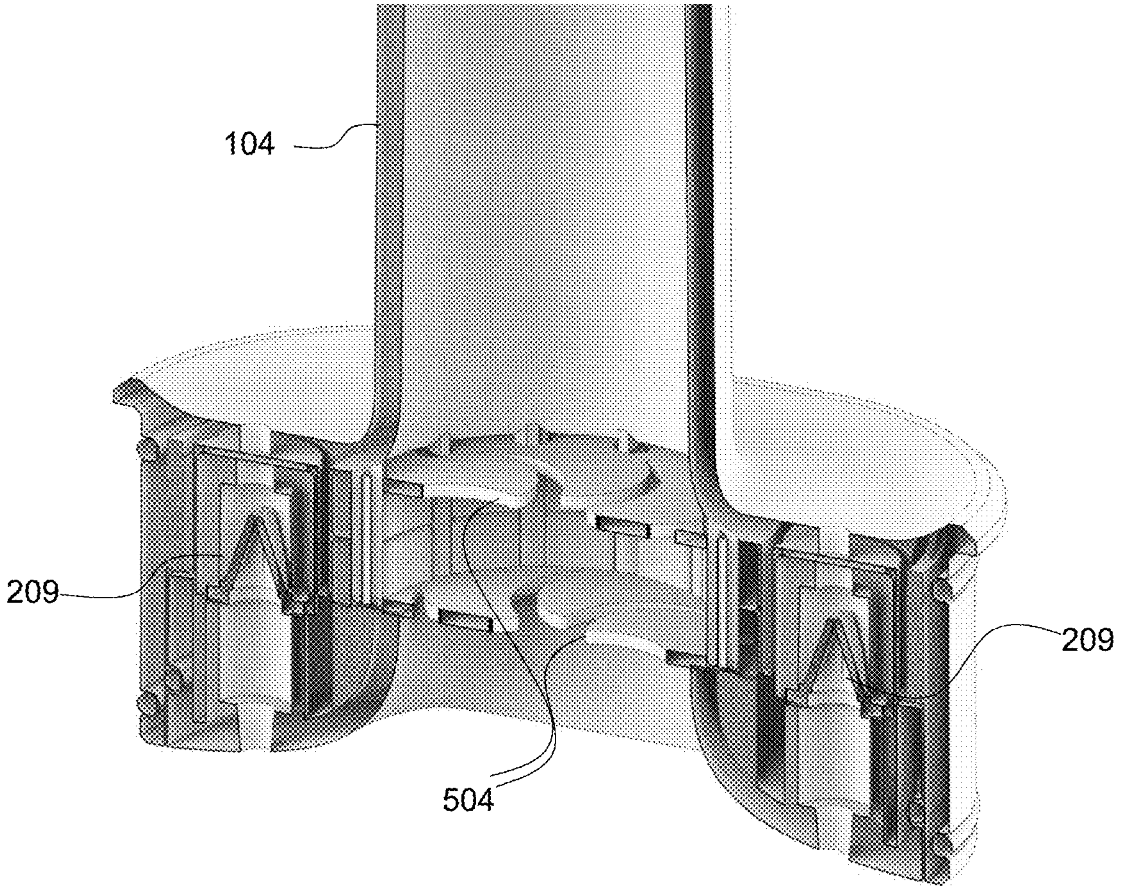
FIG. 6 shows a handle configuration for holding a razor blade, according to some embodiments of the present disclosure.

FIG. 6 shows a handle configuration for holding a razor blade, according to some embodiments of the present disclosure. In some embodiments, the configuration of FIG. 6 may be used within the context of FIG. 5 to secure an inserted razor blade by its handle. The razor handle shown in FIG. 6 can include a handle 104 (e.g. handle 104 of FIG. 5), two one-way valves 209, and a holding mechanism 504. The one-way valves 209 can be configured such that air may pass in the upward direction. For example, this may occur when the handle is inserted into the housing (e.g. housing 204 of FIG. 4). In some embodiments, holding mechanism 504 may include one or more pluralities of flaps arranged in a circular fashion. In the razor handle shown in FIG. 6, there are two pluralities of flaps, however one may suffice or, in some embodiments, a larger number. Each plurality of flaps may include an opening at the center of the circle they are arranged in. In some embodiments, the circles in which each plurality of flaps are arranged in may be concentric, such as in FIG. 6. The opening may allow for a razor blade handle to be inserted into the device handle 104. Upon insertion, the friction between the flaps and the razor blade handle may be enough such that the razor may be held in place. In some embodiments, the flaps may be made of rubber. In some embodiments, the flaps may be arranged in a non-circular fashion.

Figure 7:
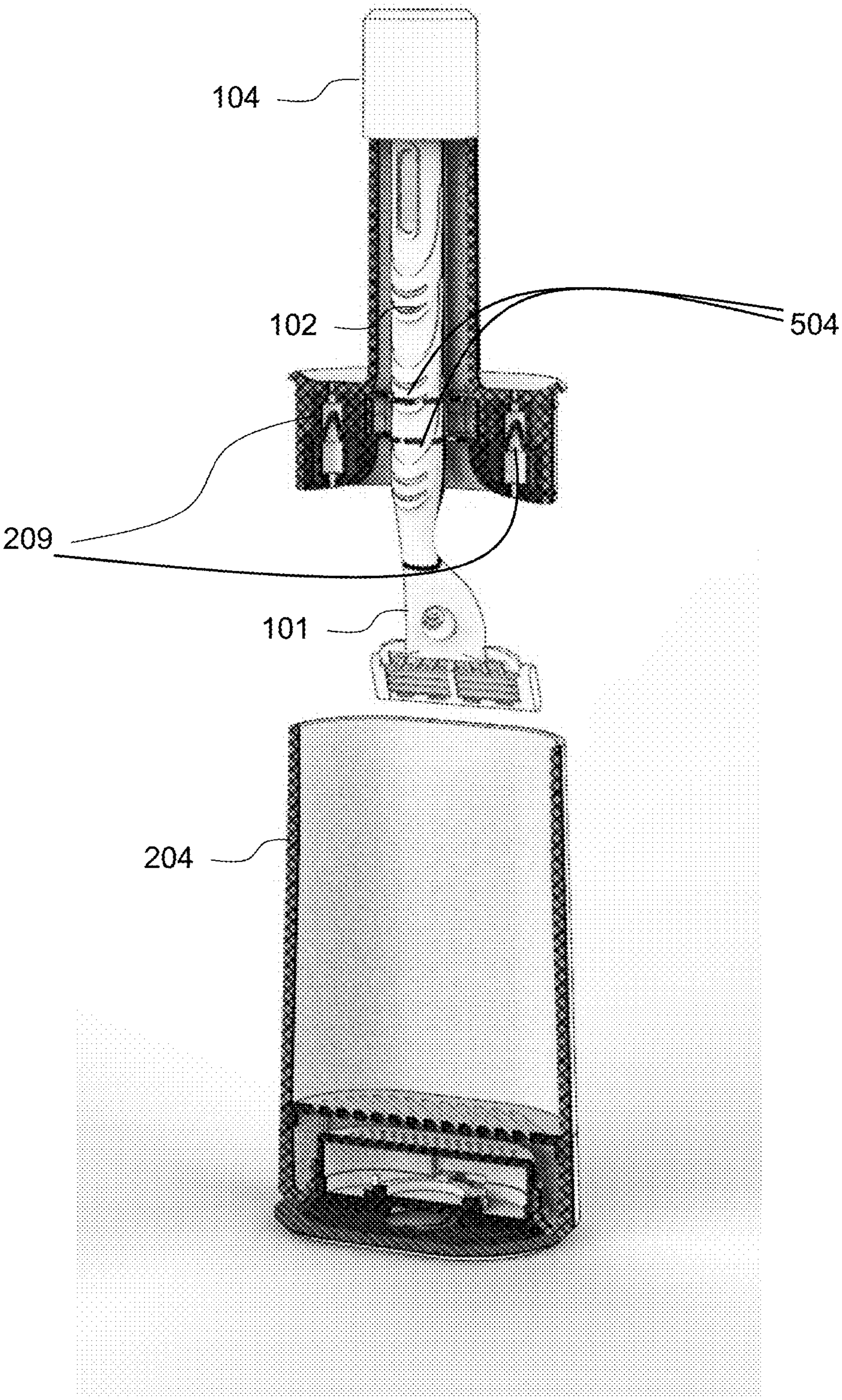
FIG. 7 shows a razor preservation device, according to some embodiments of the present disclosure.

FIG. 7 shows a razor preservation device, according to some embodiments of the present disclosure. The razor preservation device shown in FIG. 7 includes a device handle 104, a razor blade handle 102, a razor blade 101, a housing 204, and two one-way valves 209. In some embodiments, The razor preservation device shown in FIG. 7 can be the razor blade handle 102, held securely in place by the device handle 104, is inserted into the housing 204. In some embodiments, handle 104 may be securing the razor blade handle 102 via the configuration disclosed in FIG. 6. Razor blade handle 102 may be held securely by the plurality of teeth 504.

Figure 8:
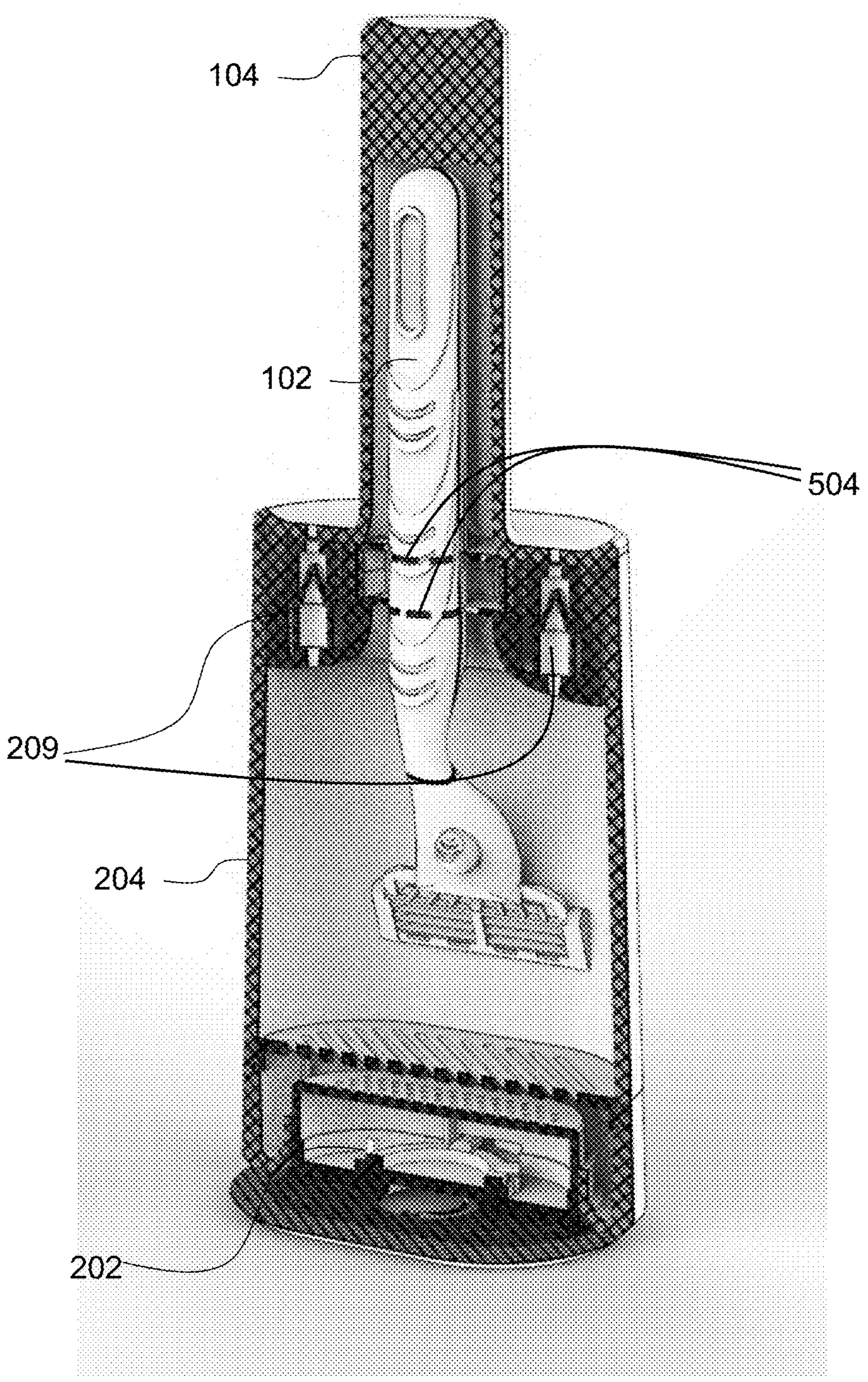
FIG. 8 also shows a razor preservation device, according to some embodiments of the present disclosure.

FIG. 8 also shows a razor preservation device, according to some embodiments of the present disclosure. The razor preservation device of FIG. 8 may include a device handle 104, a razor blade handle 102, one-way valves 209, a housing 204, and a desiccant cartridge 202. In some embodiments, the device of FIG. 8 may be the same as or similar to the device shown in FIG. 7, and may show the device operating to preserve the lifetime of the razor blade. In the inserted position depicted in FIG. 8, air within the housing 204 may have been forced out of the housing 204 upon insertion through the one-way valves 209. One-way valves 209 may also prevent outside air from entering the housing. The razor blade resides within the housing 204. Desiccant cartridge 202 may include a desiccant and may begin to remove moisture from within the housing 204 and from the razor itself. In some embodiments, the cartridge may include a ventilated surface and a perforated surface separating the desiccant material form the razor blade in the housing 204. Razor blade handle 102 may be held securely by the plurality of teeth 504.

Figure 9:
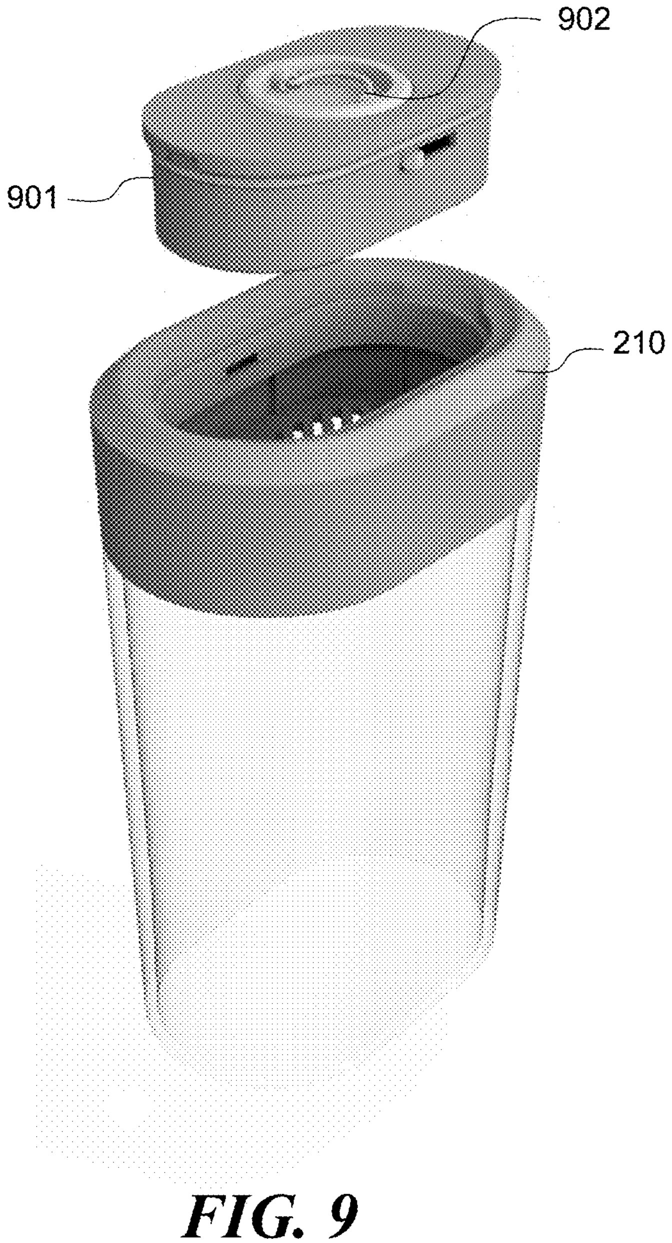
FIG. 9 shows a cartridge with a rotate latch, according to some embodiments of the present disclosure.

FIG. 9 shows a cartridge with a rotate latch, according to some embodiments of the present disclosure. The razor preservation device of FIG. 9 may include cartridge 202 with rotate latch 902, according to some embodiments of the present disclosure. Rotate latch 902 is connected to cartridge 202 and, when slid, may allow cartridge 202 to be detached from base body 210 and removed. This functionality may allow the cartridge 202 to be replaced whenever a fresh desiccant is desired. After certain amounts of time, desiccants may become saturated and experience decreased absorption rates. To maintain a certain, desired level of moisture absorption, the desiccant may then need to replaced periodically. Rotate latch 902 enables this periodic changing. In some embodiments, rotate latch 902 may include other forms of locking and release mechanisms, such as a release slider.

Figures 10A, 10B:
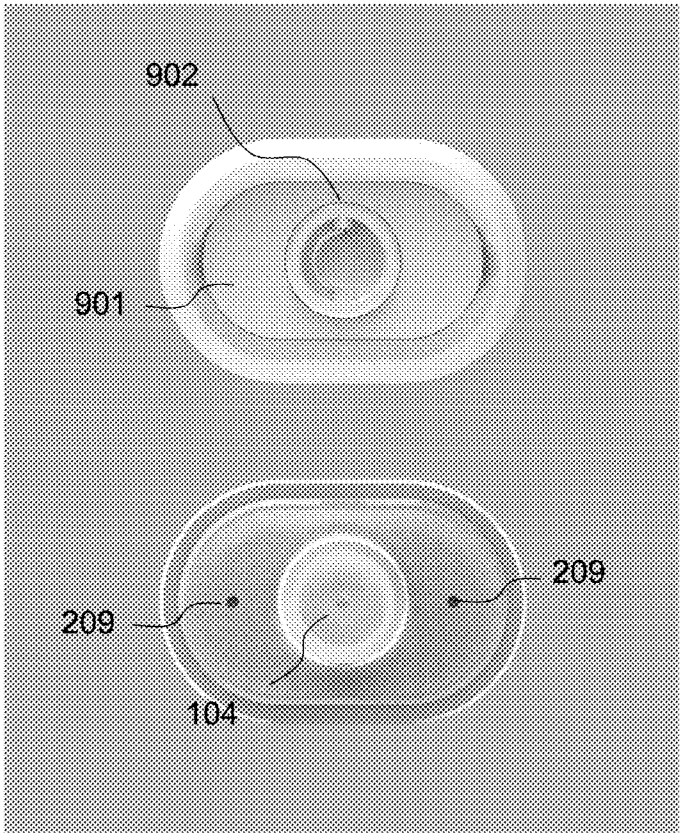
FIG. 10A is a top view of a razor preservation device, according to some embodiments of the present disclosure.
FIG. 10B is a bottom view of a razor preservation device, according to some embodiments of the present disclosure.

FIG. 10A is a top view of a razor preservation device, according to some embodiments of the present disclosure. The razor preservation device of FIG. 10A may include handle 104 and plurality of valves 209 through which air is evacuated when handle 104 is inserted into an interior of the razor preservation device. FIG. 10B is a bottom view of a razor preservation device, according to some embodiments of the present disclosure. The razor preservation device of FIG. 10B may include the desiccant cartridge 202 within the base body on which the razor preservation device may stand. In some embodiments, rotate latch 902 may be an alternative to the sliding mechanism described in relation to FIG. 9. The rotate latch may be rotated to detach a latch and remove the desiccant cartridge from the interior of the device.

Figure 11:
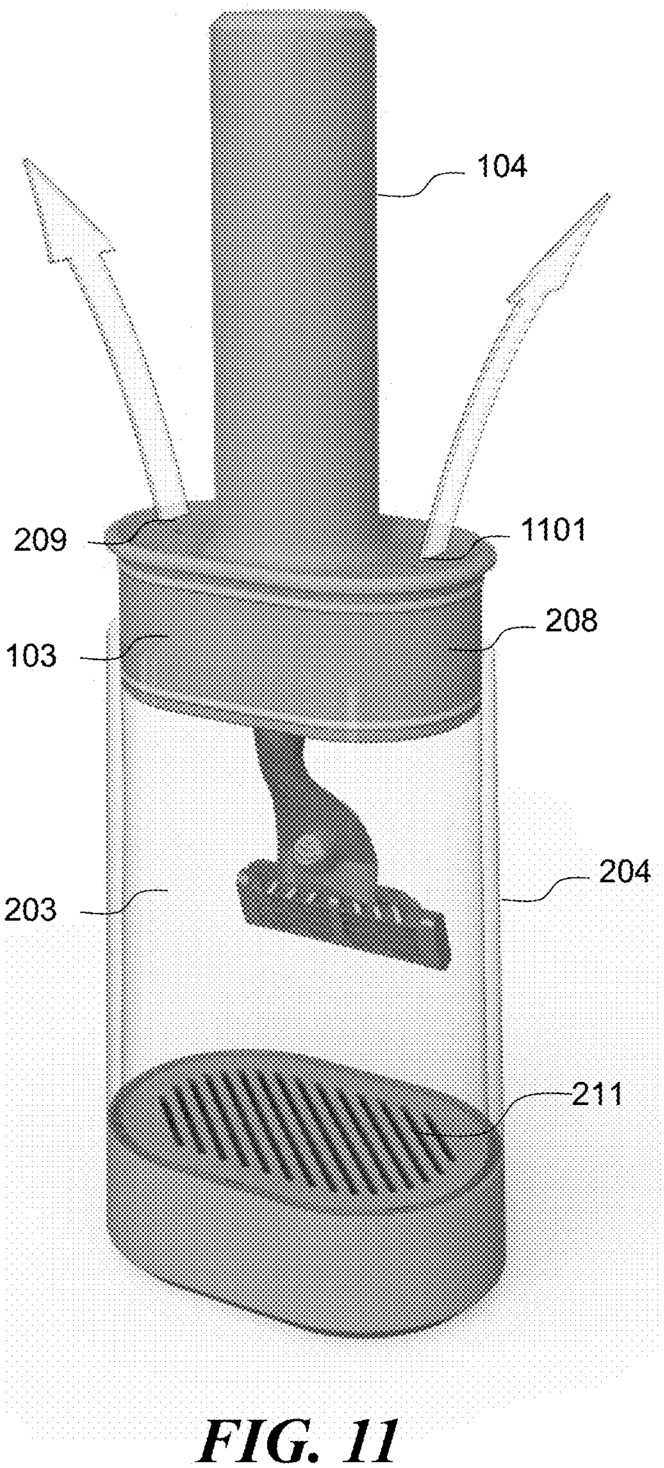
FIG. 11 shows the process of inserting a razor into a razor preservation device, according to some embodiments of the present disclosure.

FIG. 11 shows the process of inserting a razor into a razor preservation device, according to some embodiments of the present disclosure. The razor preservation device of FIG. 11 may have air evacuated through plurality of valves 209 on handle 104 when handle 104 is inserted into housing 204, according to some aspects of the present disclosure. When handle 104 is not inserted into housing 204, as in FIG. 4, opening 103 with which handle 104 can be inserted is the only opening of the device, meaning air from interior 203 may only escape through opening 103. When handle 104 is inserted into housing 204, the air in interior 203 moves to accommodate the entry of handle 104. Plunger 208, however, and, to an extent, handle 104 itself, prevent the air from exiting through opening 103. Plurality of valves 209, however, may be configured to allow the air to be forced through them, exiting interior 203. This may allow handle 104 to be fully inserted into housing 204 without much resistance and may evacuate air from interior 203, which may decrease oxygen levels.

Figure 12:
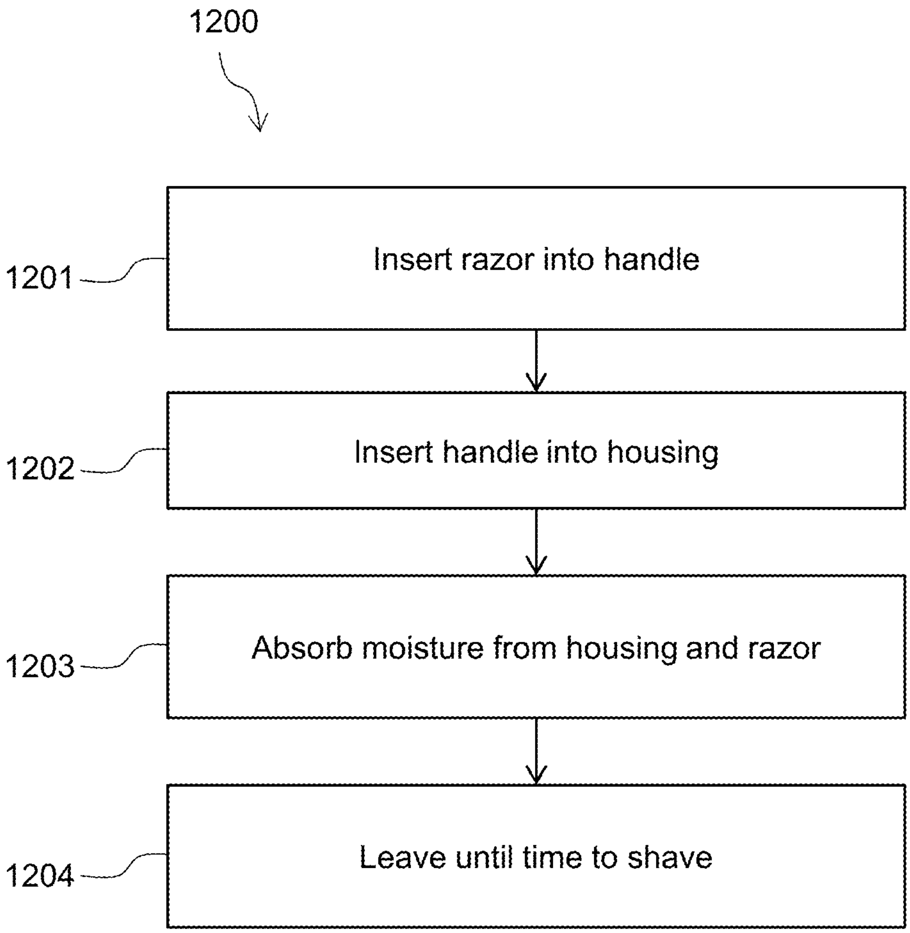
FIG. 12 is a flowchart of a method of extending the lifetime of a razor blade, according to some embodiments of the present disclosure.

FIG. 12 is a flowchart of a method 1200 of extending the lifetime of a razor blade using the device of the present disclosure, according to some embodiments of the present disclosure. In various embodiments, the method may start with block 1201, where a user may insert razor blade handle 102 into hollowed inside portion 103 of handle 104 of the device, as shown in FIG. 5. In some embodiments, hollowed inside portion 103 may be configured to hold a variety of razor blade handle shapes and sizes. Inner surface 504 of inside portion 103 may be configured such that the friction between inner surface 504 and razor blade handle 102 is sufficient to securely hold razor 501 in place, which may prevent it from falling out. In some embodiments, hollowed inside surface 504 can be made of rubber.

Next, at block 1202, the user may insert handle 104 into housing 204. As handle 104, which may be equivalent to handle 104 of FIG. 5, is being inserted, the air within interior 203 of housing 204 may move to accommodate the insertion of handle 104 and razor blade 501. This air may be forced through plurality of valves 209 located on handle 104 being inserted, allowing razor blade 501 to reside within interior 203 in an environment with less air than the exterior environment. In some embodiments, when handle 104 is fully inserted, seal 208 disposed between handle 104 and housing 204 may seal interior 203 and prevent exterior air from re-entering interior 203.

Figure 15:
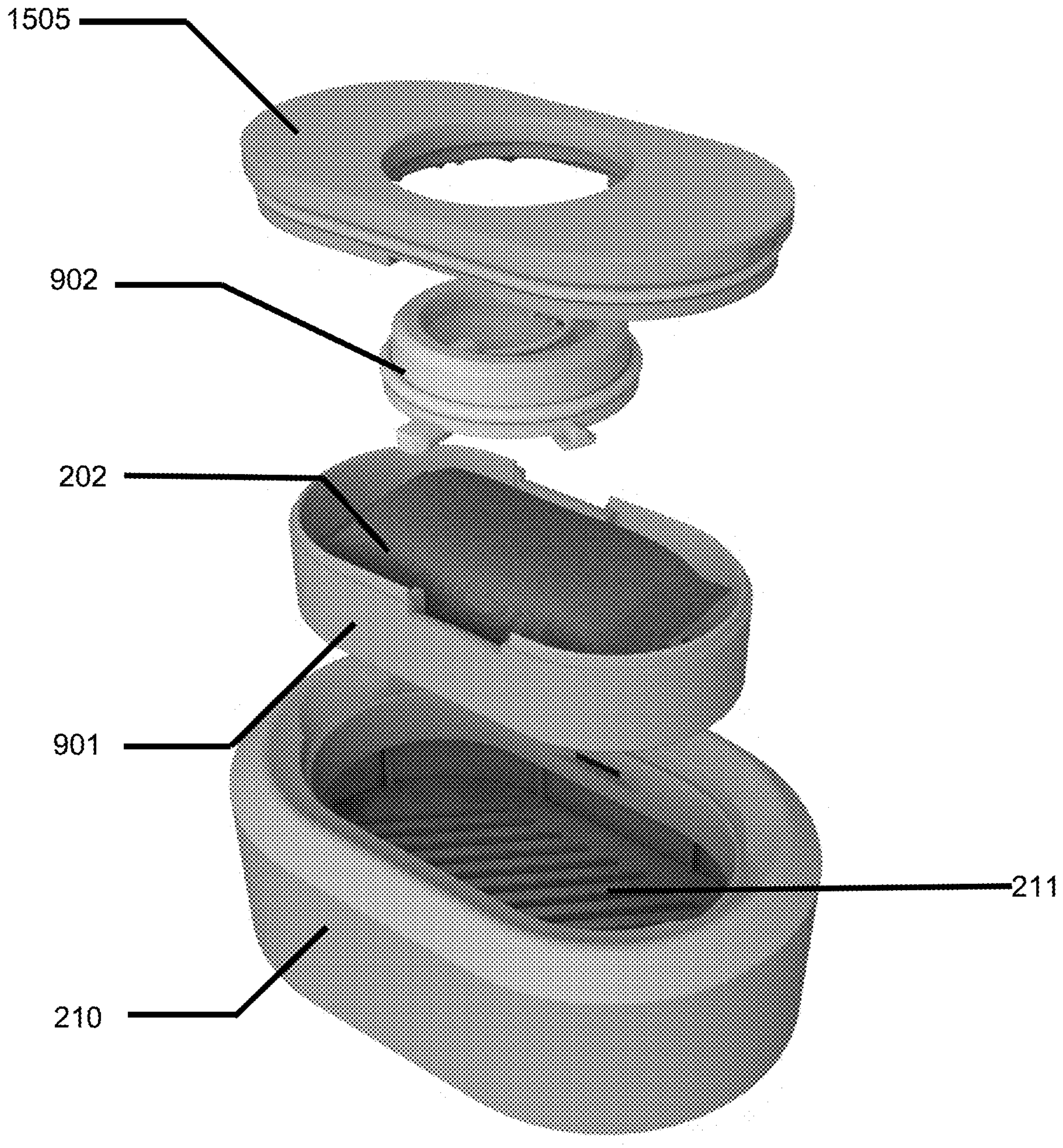
FIG. 15 is an exploded view of a desiccant cartridge of a razor preservation device, according to some embodiments of the present disclosure.

At block 1203, ventilated surface 211 may expose desiccant 203 stored in cartridge 204 in base body 210, from FIG. 15, to interior 203 of housing 204, allowing desiccant 203 to absorb and remove moisture from interior 203. Razor blade 501 thus resides in an environment with less air and less moisture than it would otherwise be exposed to had it been left out on a bathroom sink. This environment can reduce the levels of oxidation and moisture buildup on the razor blade.

At block 1204, the user may leave razor blade 501 in the preservation device until the next time a shave is needed, which may allow razor blade 501 to be stored in this environment whenever it is not being used, which may account for the majority of its lifetime.

In some embodiments, when the user decides it's time to use the razor again, the user may, as shown in FIG. 4, remove handle 104 from housing 204. Removing handle 104 may open an airway, allowing the seal to be broken and exterior air to enter interior 203. This may enable the removal of a razor from housing 204. From this point, the user can remove a razor from handle 104 and use it to shave. In some embodiments, hollowed inside portion 103 of handle 104 may hold razor handle 102 secure enough that the user may shave while gripping the handle, without removing razor 501 and gripping razor handle 102.

Figure 13:
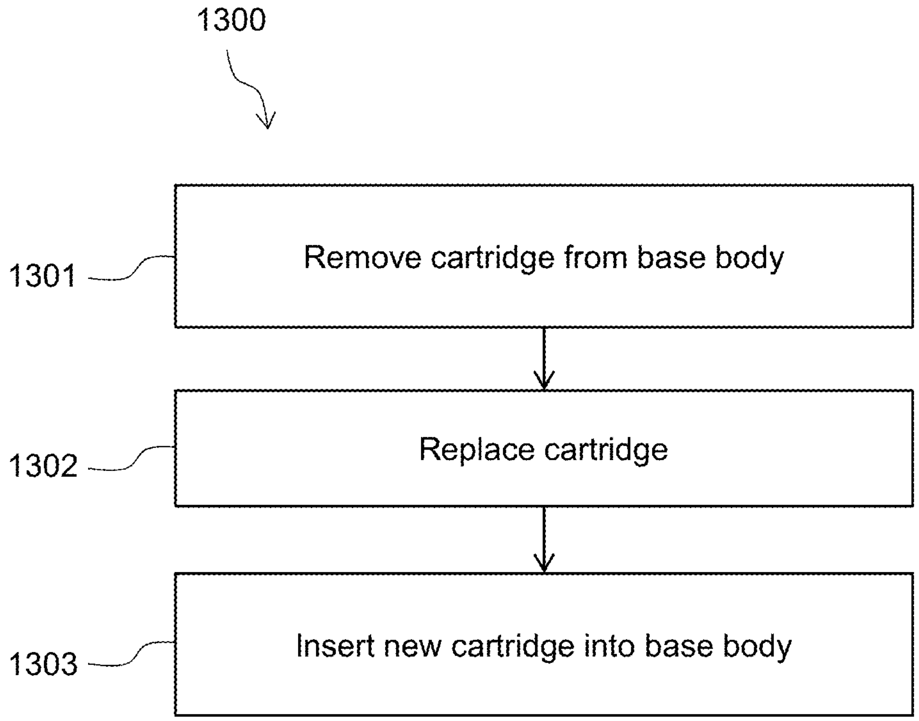
FIG. 13 is a flowchart of a method for replacing a desiccant of a razor preservation device, according to some embodiments of the present disclosure.

FIG. 13 is a flowchart of a method 1300 for replacing the desiccant of the device, according to some embodiments of the present disclosure. When the user wishes to utilize a fresh desiccant in their device, they may remove the cartridge holding the desiccant from the base body and replace it with a new cartridge containing a fresh desiccant. In some cases, this may be because they think they need a new desiccant. In other cases, this may be because the user wishes to utilize a desiccant with a higher or lower capability for water absorption based on the user's razor. In other cases, this may be because the desiccant has changed color and indicated that a new desiccant is needed.

In various embodiments, at block 1301 the user may remove cartridge 202 from base body 210, shown in FIG. 9, by rotating rotate latch 902 connected to cartridge 202. Rotate latch 902 releases cartridge 202 from base body 210, allowing it to be removed.

Once cartridge 202 is removed, the user may proceed to block 1302 and dispose of the cartridge containing the desiccant. They then may replace it with a new cartridge containing a fresh desiccant. This new desiccant may have different properties than the previous one. The user can proceed to block 1303 and insert the new cartridge 202 into base body 210, allowing a new desiccant to begin its removal of moisture from the interior.

Figure 14:
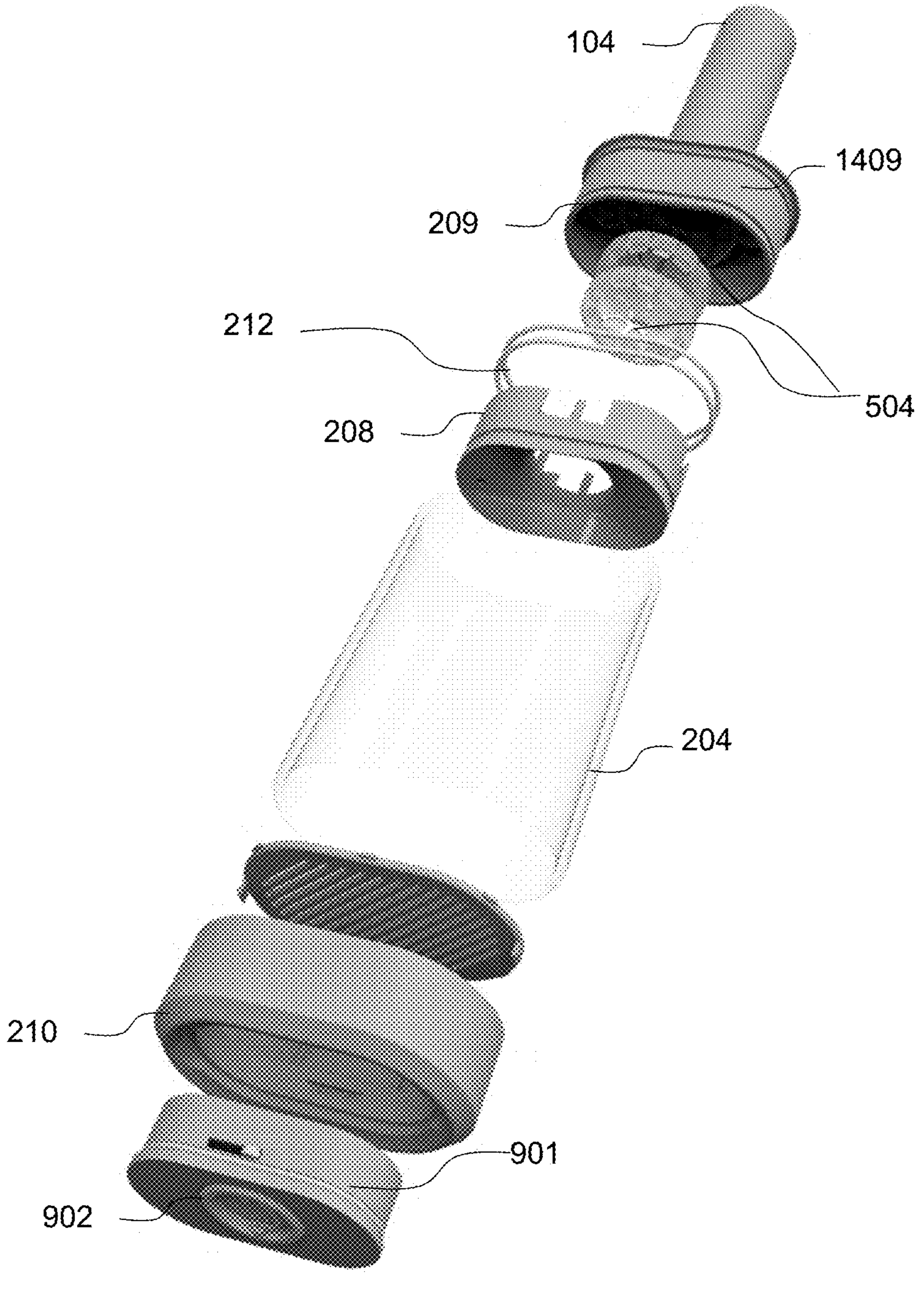
FIG. 14 is an exploded view of a razor preservation device, according to some embodiments of the present disclosure.

FIG. 14 is an exploded view of the device according to some embodiments of the disclosure. It shows, unconnected, parts of some embodiments, including cartridge 202 to hold a desiccant (not shown) with rotate latch 902, base body 210, housing 204, handle 104 with a plurality of teeth 504 configured to hold an inserted razor blade handle, plurality of valves 209 on handle 104, and plunger 208 with rubber strips/bands 212. In some embodiments, the valves may be made of silicone. In some embodiments, the handle may be made of plastic and the razor holder may be made of silicone. In some embodiments, the body may be made of acrylic. In some embodiments, the plunger may be made of silicone. In some embodiments, the base body, cartridge, or rotate latch may be made of plastic. In some embodiments, the device may be manufactured by ultrasonic welding.

FIG. 15 is an exploded view of base body 210 and cartridge 202 of FIG. 9, according to some embodiments of the present disclosure, showing base body 210, rotate latch 902, cartridge 202, desiccant pouch 1504, lid 1505, and ventilated surface 211. Cartridge 202 contains the desiccant pouch 1504, and lid 1505 separates the desiccant pouch 1504 from the exterior environment, ensuring the only moisture absorbed comes from the inside of the device. Desiccant pouch 1504 may contain a variety of hygroscopic materials. In some embodiments, desiccant pouch 1504 may also contain desiccants of different strengths according to different embodiments of the device. For example, a user may want to use the device to store and increase the lifetime of a razor with a lubrication strip (e.g. Gillette Fusion ProGlide). Lubrication strips are features added to higher-end razors that help maintain a certain moisture level at the blade to decrease the friction while shaving and reduce irritation. However, exposure to too strong of a desiccant may dry out the lubrication strip and render it inoperative. Thus, there may be embodiments of the razor preservation device with different levels of moisture absorption (e.g. high, medium, low) that may be applicable to different types of razors depending on the user's preferences.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. A razor blade preservation device that extends the lifetime of a razor blade comprising:

a housing having a first opening at a first end of the housing and a second opening opposite of the first end, wherein the housing forms an interior;

a desiccant to absorb moisture within the housing;

a cartridge to hold the desiccant, wherein one side of the desiccant is exposed to air inside the interior;

a base body connected to the second opening of the housing, having a cavity to receive and hold the cartridge;

a handle having a hollowed inside portion configured to hold an inserted razor blade handle;

at least one one-way valve connected to the handle that, when the handle is inserted into the housing, allows air to be evacuated from the interior of the housing.

2. The preservation device of claim 1, wherein the handle comprises a seal that is disposed between the handle and the housing to seal the interior.

3. The preservation device of claim 2, wherein the hollowed inside portion of the handle comprises rubber and is configured to hold a variety of razor blade handle shapes.

4. The preservation device of claim 2, wherein the seal comprises two rubber strips to seal the interior.

5. The preservation device of claim 1, wherein the base body comprises a ventilated surface to expose the desiccant to the interior of the housing.

6. The preservation device of claim 5, wherein the base body comprises a perforated surface below the ventilated surface enclosing the desiccant.

7. The preservation device of claim 1, wherein the cartridge comprises a release slider connected to the cartridge which, when slid, allows the cartridge to be detached from the base body and removed.

8. The preservation device of claim 1, wherein the cartridge comprises a rotate latch connected to the cartridge which, when rotated, allows the cartridge to be detached from the base body and removed.

9. The preservation device of claim 1, wherein the hollowed inside portion comprises:

a plurality of flaps arranged in a circle; and an opening at a center of the circle, wherein the inserted razor blade handle is inserted through the circle and friction between the plurality of flaps and the razor blade handle holds the razor in place.

10. The preservation device of claim 9, wherein each flap of the plurality of flaps is made of rubber.

11. The preservation device of claim 9, wherein the plurality of flaps is a first plurality of flaps and the circle is a first circle, wherein the hollowed inside portion comprises:

a second plurality of flaps arranged in a second circle; and an opening at a center of the second circle, wherein the razor blade handle is inserted through the first and second circles and friction between the first and second plurality of flaps and the razor blade handle holds the razor in place.

12. The preservation device of claim 11, wherein the first and second circles are concentric.

13. The preservation device of claim 1 comprising a pouch to contain the desiccant.

14. The preservation device of claim 1, wherein the desiccant comprises an indicator that reflects a strength of the desiccant.

15. The preservation device of claim 1, wherein the desiccant changes color, wherein the color reflects a level of saturation.

* * * * *